United States Patent
Lee et al.

(10) Patent No.: US 9,449,626 B2
(45) Date of Patent: Sep. 20, 2016

(54) STRUCTURE POSITIONED BETWEEN MAGNETIC POLE AND NEAR-FIELD TRANSDUCER

(71) Applicant: Seagate Technology LLC, Cupertino, CA (US)

(72) Inventors: Tae-Woo Lee, Eden Prairie, MN (US); David M. Grundman, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/886,524

(22) Filed: Oct. 19, 2015

(65) Prior Publication Data

US 2016/0133286 A1    May 12, 2016

Related U.S. Application Data

(60) Provisional application No. 62/076,848, filed on Nov. 7, 2014.

(51) Int. Cl.
| | | |
|---|---|---|
| *G11B 5/02* | (2006.01) | |
| *G11B 5/147* | (2006.01) | |
| *G11B 5/48* | (2006.01) | |
| G11B 11/00 | (2006.01) | |
| G11B 5/00 | (2006.01) | |

(52) U.S. Cl.
CPC ..... *G11B 5/4866* (2013.01); *G11B 2005/0021* (2013.01)

(58) Field of Classification Search
CPC ... G11B 5/3163; G11B 6/1226; G11B 5/012; G11B 5/1278; G11B 5/187; G11B 5/314; G11B 5/3133; G11B 5/4866; G11B 5/6088
USPC ............. 360/59, 125.31, 235.4; 369/13.14, 369/13.33, 13.36
See application file for complete search history.

(56) References Cited

U.S. PATENT DOCUMENTS

| 7,974,043 B2* | 7/2011 | Shimazawa | G11B 5/02 360/125.31 |
|---|---|---|---|
| 8,773,959 B2 | 7/2014 | Gao et al. | |
| 2014/0050486 A1 | 2/2014 | Bain et al. | |

* cited by examiner

*Primary Examiner* — Nabil Hindi
(74) *Attorney, Agent, or Firm* — Hollingsworth Davis, LLC (57) ABSTRACT

An apparatus includes a waveguide, a magnetic pole, and a near-field transducer. The near field transducer is positioned at or near a media-facing surface. The near-field transducer is operatively coupled to the waveguide. The near-field transducer includes an enlarged region. The near-field transducer also includes a peg region extending from the enlarged region towards the media-facing surface. The peg region is separated from the magnetic pole. The near-field transducer also includes a structure positioned between the magnetic pole and the peg region. The structure is separated from the peg region by a gap. The structure extends from the enlarged region towards the media-facing surface. The structure is configured to extend generation of surface plasmons toward the magnetic pole.

19 Claims, 13 Drawing Sheets

Baseline: local near-field from peg tends to spread

FIG. 5A

Near-field coupling between peg and coupler: Induce concentrated local near-field

STRUCTURE POSITIONED BETWEEN MAGNETIC POLE AND NEAR-FIELD TRANSDUCER

RELATED PATENT DOCUMENTS

This application claims the benefit of Provisional Patent Application Ser. No. 62/076,848 filed on Nov. 7, 2014, to which priority is claimed pursuant to 35 U.S.C. §119(e), and which is incorporated herein by reference in its entirety.

SUMMARY

Embodiments are directed to an apparatus comprising a waveguide, a magnetic pole, and a near-field transducer. The near field transducer is positioned at or near a media-facing surface. The near-field transducer is operatively coupled to the waveguide. The near-field transducer includes an enlarged region. The near-field transducer also includes a peg region extending from the enlarged region towards the media-facing surface. The peg region is separated from the magnetic pole. The near-field transducer also includes a structure positioned between the magnetic pole and the peg region. The structure is separated from the peg region by a gap. The structure extends from the enlarged region towards the media-facing surface. The structure is configured to extend generation of surface plasmons toward the magnetic pole.

Various embodiments are directed to an apparatus comprising a waveguide, a magnetic pole, and a near-field transducer. The near field transducer is positioned at or near a media-facing surface. The near-field transducer is operatively coupled to the waveguide. The near-field transducer includes an enlarged region. The near-field transducer also includes an inverse trapezoidal peg region extending from the enlarged region towards the media-facing surface. The peg region is separated from the magnetic pole. The near-field transducer also includes a structure positioned between the magnetic pole and the peg region. The structure is separated from the peg region by a gap. The structure extends from the enlarged region towards the media-facing surface. The structure is configured to extend generation of surface plasmons toward the magnetic pole.

Some embodiments include a method comprising focusing light propagating through a waveguide onto a near-field transducer. The near-field transducer comprises an enlarged region. The near-field transducer also includes a peg region extending from the enlarged region towards the media-facing surface. The peg region is separated from a magnetic pole. The near0field transducer also includes a structure positioned between the magnetic pole and the peg region and separated from the peg region by a gap. The structure extends from the enlarged region towards the media-facing surface. The method also includes extending generation of surface plasmons towards the magnetic recording pole via the structure.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

One way to achieve a tiny confined hot spot is to use an optical near-field transducer (NFT), such as a plasmonic optical antenna or an aperture, located near an air-bearing surface of a hard drive slider. Light may be launched from a light source (e.g., a laser diode) into optics integrated into a slider. An example of such integrated optics includes a waveguide formed from core and cladding layers with high contrast between respective refractive indices. Light propagating in the waveguide may be directed to an optical focusing element, such as a planar solid immersion mirror (PSIM), which concentrates the energy into the NFT. In other embodiments, no focusing element is used, and light is directly coupled from an end of the waveguide to the NFT.

A waveguide, NFT, and PSIM are examples of integrated optical devices that are formed within the slider. The field of integrated optics generally relates to the construction of optics devices on substrates, sometimes in combination with electronic components, to produce functional systems or subsystems. For example, light may be transferred between components via waveguides that are built up on a substrate using layer deposition techniques. These waveguides may be formed as a layer of materials, with a middle core layer having a relatively high refractive index, and top/bottom cladding layers of relatively low refractive index. Other optical components may be formed in similar fashion, such as collimators, mode convertors, etc.

In a HAMR slider, light is launched into these integrated optics components from a light source such as a laser diode. One way to launch light into a slider is from an externally mounted laser via an optical waveguide or grating coupler fabricated in a slider. Another way is to place a laser light source, such as a laser diode, into the slider, called laser-in-slider (LiS) light delivery. In laser-in-slider configurations, light is launched from the emitting facet of a laser diode into an optical waveguide. Laser-in-slider light delivery can be integrated at a wafer level and may be suitable for mass production.

In a HAMR device, high linear density capability can be achieved by ensuring the hotspot on the recording medium has a large thermal gradient in a downtrack direction. The large thermal gradient helps ensure sharp magnetic transitions between bits as they are being recorded, making data easier to read back. One way of achieving the large thermal gradients is to increase the amount of power delivered by the laser to the NFT. However, the NFT and surrounding areas may be negatively impacted by high temperatures. In embodiments described below, a metal structure placed between the NFT and magnetic pole can increase thermal gradient (e.g., by 50% or more) without significant increases in NFT temperatures compared to a baseline configuration without the structure.

In some cases, high local temperatures can cause magnetic recording pole material to become diffused surrounding materials. For example, in one embodiment, the NFT is configured as a disc with a protruding peg. A dielectric material surrounds the peg and also is disposed between the NFT and the recording pole. High temperatures can cause material of the pole to diffuse into this dielectric material, causing degradation of NFT performance and reducing a lifetime of the head. Adding an auxiliary structure between the pole and the peg can block pole material diffused into NPS.

According to various implementations the structure between an NFT and a recording pole is metallic (e.g., Au or Ag). In some cases the auxiliary structure is wide enough to span an area of the pole that faces a peg region of the NFT. The auxiliary structure may enable a near-field coupling with the peg, causing concentration of near-field in a localized area. This can in turn improve coupling efficiency with the recording media and increase thermal gradient of the hotspot.

Figure 1:
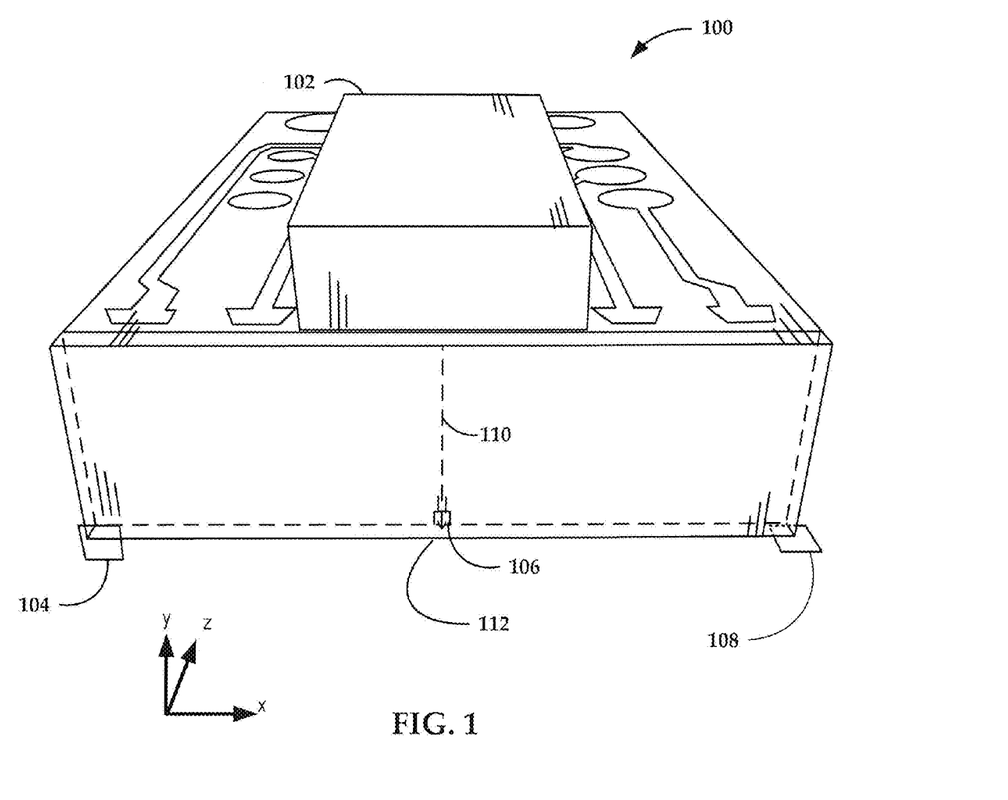
FIG. 1 is a perspective view of a hard drive slider that includes a disclosed near-field transducer.

FIG. 1 is a perspective view of a hard drive slider that includes a disclosed plasmonic near-field transducer (NFT) and associated structure. The HAMR slider 100 includes laser diode 102 located on top of HAMR slider 100 proximate to trailing edge surface 104 of HAMR slider 100. Laser diode 102 delivers light proximate to read/write head 106, which has one edge on air-bearing surface (also referred to as "media-facing surface") 108 of HAMR slider 100. Air-bearing surface 108 is held proximate to a moving media surface (not shown) during device operation.

Laser diode 102 provides electromagnetic energy to heat the media at a point near to read/write head 106. Optical coupling components, such as a waveguide 110, are formed integrally within HAMR slider 100 to deliver light from laser diode 102 to the media. In particular, local waveguide 110 and NFT 112 may be located proximate read/write head 106 to provide local heating of the media during write operations. Laser diode 102 in this example may be an integral, edge-emitting device (also called an in-plane laser), although it will be appreciated that waveguide 110 and NFT 112 may be used with any light source and light delivery mechanisms. For example, a surface emitting laser (SEL) may be used instead of an edge-emitting laser.

While the example in FIG. 1 shows laser diode 102 integrated with HAMR slider 100, NFT 112 discussed herein may be useful in any type of light delivery configuration. For example, in a free-space light delivery configuration, a laser may be mounted externally to the slider, and coupled to the slider by way of optic fibers and/or waveguides. The slider in such an arrangement may include a grating coupler into which light is coupled and delivered to slider-integrated waveguide 110 which energizes NFT 112.

When writing to a HAMR medium, the light can be concentrated into a small hotspot over the track where writing takes place. The light propagates through waveguide 110 where it is coupled to NFT 112 either directly from the waveguide or by way of a focusing element. Other optical elements, such as couplers, mirrors, prisms, etc., may also be formed integral to the slider. The optical elements used in HAMR recording heads are generally referred to as integrated optics devices.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, NFT 112 is employed to create a hotspot on the media.

An NFT as described herein may include an enlarged region and a peg region. In the context of describing an NFT, the term "region" is used interchangeably with "portion" and refers to a bounded three-dimensional feature in which the boundaries may either be physical boundaries or may be arbitrarily chosen for exemplary reasons. These NFTs can include a disk-shaped enlarged region made of a plasmonic metal and is configured to receive light from a laser diode. The peg region is in optical and/or electrical communication with the disk-shaped enlarged region and I creates a focal point for the energy received by the enlarged region. In the context of describing an NFT, the term "disk" refers to three-dimensional shapes that include a cylinder, a base side, and a top side that may or may not be in a plane parallel with the base side.

Figure 2:
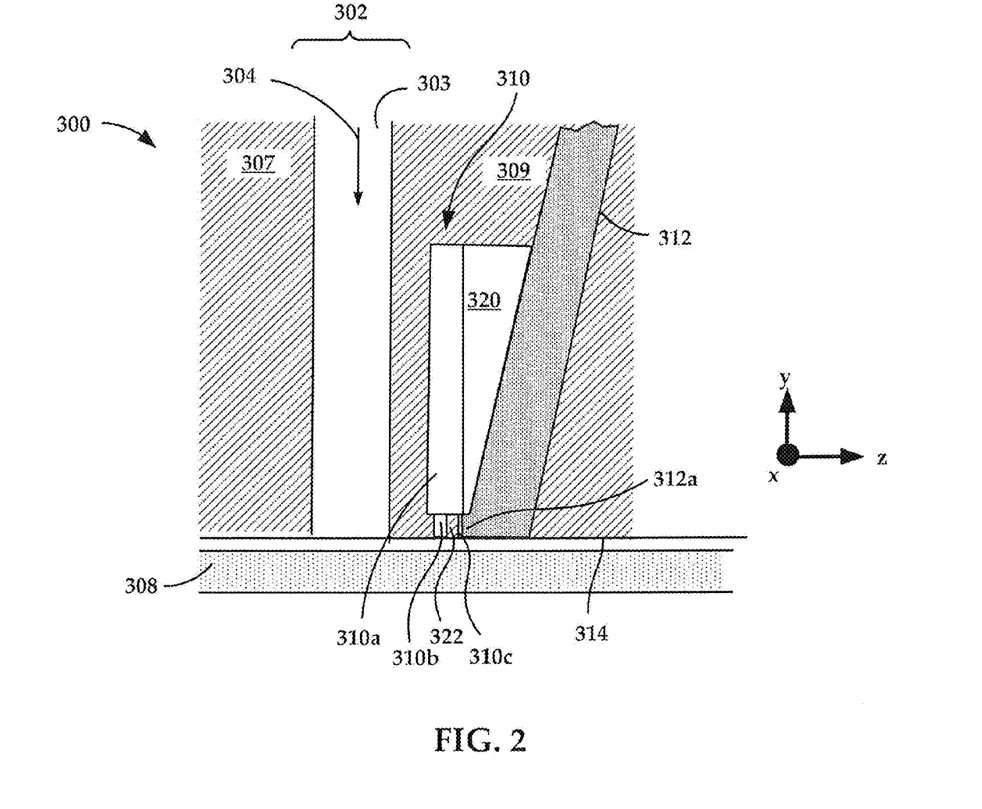
FIG. 2 is a side cross-sectional view of an exemplary provided near-field transducer and waveguide according various embodiments described herein.

The present disclosure relates to systems and apparatuses that include plasmonic near-field transducers. In reference now to FIG. 2, a cross-sectional view shows details of an NFT 310 and waveguide 302 of a HAMR apparatus 300 according to an example embodiment. The NFT 310, waveguide 302, and other components are built on a substrate plane, which is parallel to the xy-plane in this view. The NFT 310 is located proximate a media-facing surface 314 (e.g., ABS), which is held near a recording medium 308 during device operation, e.g., magnetic disk. In the orientation of FIG. 2, the media-facing surface 314 is parallel to the xz-plane. An elongated waveguide core 303 may be disposed proximate the NFT 310, NFT 310 being located at or near the media-facing surface 314.

Waveguide core 303 is shown surrounded by cladding layers 307 and 309 that have different indices of refraction than core 303. Light 304 propagates through the waveguide core 303 along the negative y-direction. Further illustrated in FIG. 2 is magnetic recording pole 312 that is located alongside NFT 310. Magnetic pole 312 generates a magnetic field (e.g., perpendicular field) used in changing the magnetic orientation of the hotspot during writing.

The NFT 310 includes an enlarged region 310a of plasmonic material (e.g., gold, silver, copper, and combinations or alloys thereof). A peg region 310b of plasmonic material is in contact with at least a portion of base side of enlarged region 310a. Peg region 310b extends from enlarged region 310a towards media-facing surface 314. The tip of the peg region 310b may have different cross-section and or size from the body of the peg region 310b. The NFT 310 may be coupled to (or include) a heat sink 320. The heat sink 320 contacts the enlarged region 310a of the NFT 310 and a side of the recording pole 312.

The magnetic recording pole 312 includes an extension 312a that extends toward the peg region 310b near the media-facing surface 314. The peg region 310b of the NFT 310 is separated from the extension 312a of the magnetic recording pole 312. The NFT 310 includes a structure 310c that is positioned between the magnetic recording pole 312 and the peg region 310b. The structure 310c extends from the enlarged region 310a towards the media-facing surface 314 and is configured to couple the magnetic recording pole 312a to the peg region 310b. A dielectric material fills a gap 322 between the structure 310c and peg region 310b.

Figure 3:
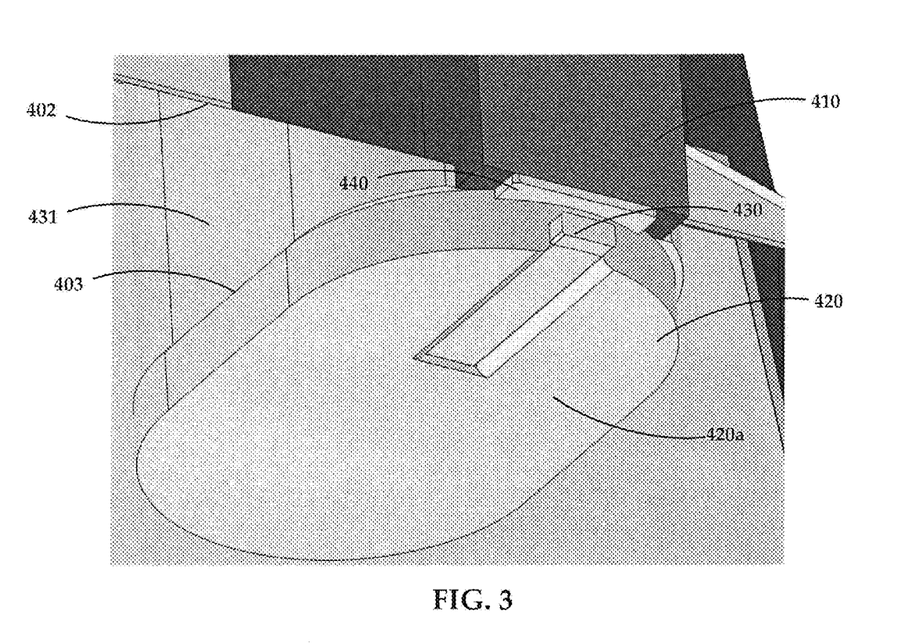
FIGS. 3 and 4A-4B show modeled NFTs according to various embodiments.
Figure 4A:
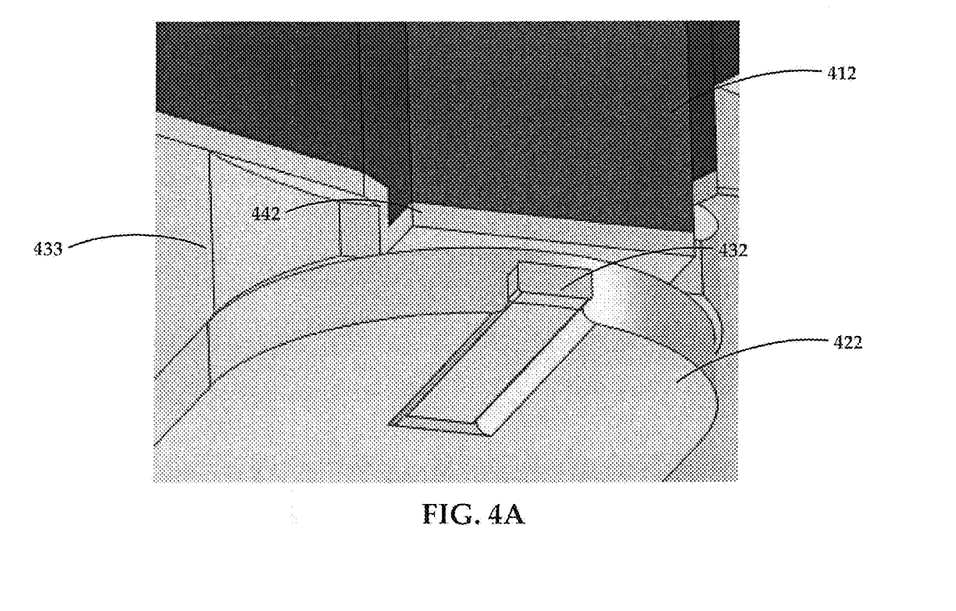
Figure 4B:
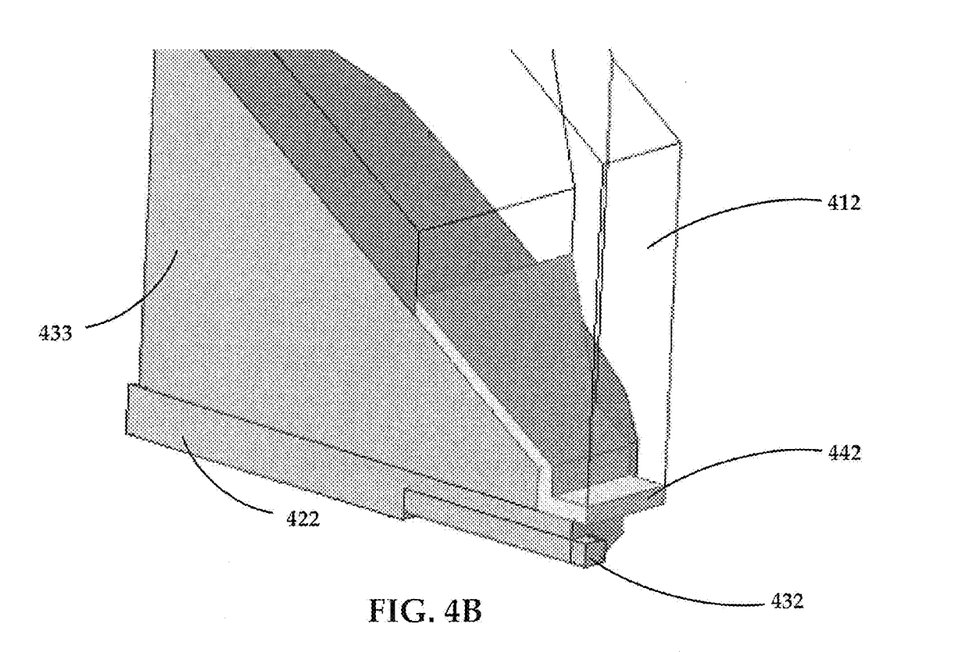

FIGS. 3, 4A, and 4B are perspective views of an NFT according to an example embodiment. As seen in FIG. 3, the NFT includes enlarged region 420 that has a side facing a magnetic pole 410 and an opposite side 420a facing away from the magnetic pole 410. A heat sink 431 is between the enlarged region 420 and the magnetic pole 410. While the various embodiments described herein are applicable to a variety of NFT designs, including stadium-style (NTS), lollipop-style (NTL) planar plasmon generator (PPG), and edge plasmon generator (EPG) near-field transducer designs, FIG. 3 illustrates an NFT having a near field transducer NTS design in accordance with various embodiments described herein. The enlarged region 420 includes a first planar surface 403 and an opposing second planar surface 402. The second planar surface 402 has a generally sloped shape, from which the term stadium-style derives, and is oriented in a non-parallel relationship with respect to the first planar surface 403.

In the embodiment illustrated in FIG. 4A, the enlarged portion 420 is an elongated plate with circular rounded ends.

The NFT of FIG. 3 also has peg region 430 that is in contact with at least a portion of base side of enlarged region 420 and extends from enlarged region 420 towards a media-facing surface. As shown in FIG. 3, peg region 430 is an extension of enlarged region 420. In some cases, the end of the peg region 430 may be tapered to provide a smaller surface area at the tip of the peg region to better focus the energy from the NFT onto a small spot on the media. The NFT includes an auxiliary structure 440 between the magnetic pole 410 and the peg region 430. In this example, the auxiliary structure 440 dies not completely span the magnetic pole 410 in a cross track direction.

FIG. 4A illustrates another NFT near a magnetic pole 412, the NFT having an enlarged region 422, a peg region 432, a heat sink 433, and an auxiliary structure 442. In the embodiment shown in FIG. 4A, the auxiliary structure 442 spans a cross track length of the magnetic pole 412 that faces the NFT, completely covering the NFT-facing surface of the pole 412. The auxiliary structure 442 also extends between the heat sink 433 and magnetic pole 412. In FIG. 4B, a perspective cross-sectional view illustrates details of the auxiliary structure 442 of FIG. 4A. Generally, the auxiliary structure 442 can be seen extending partially along a sloped part of the magnetic pole 412, where it cuts into an NFT-facing surface of the magnetic pole 412

In the examples shown in FIGS. 3, 4A, and 4B, the NFT is shown as an elongated plate with circular ends. However other shapes of enlarged region are also contemplated. For example, the enlarged region may be configured as a plate with different outside profile, such as triangular, elliptical, rectangular, circular, triangular parallelepiped etc.

According to various implementations, near-field tends induced by the peg tends to be coupled back to the body of the NFT were initial optical excitation happens. Due to this effect, near-field may spread and, thus, local hot spot may become broadened. Adding optically interacting auxiliary structure under the magnetic pole near the peg may concentrates near-field toward the magnetic pole. Concentrating the near field toward the magnetic pole may have the effect of increasing the thermal gradient in a down track direction.

Figure 5A:
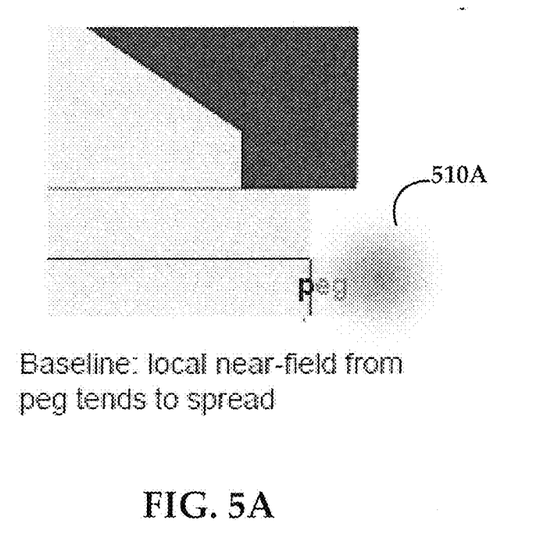
FIG. 5A illustrates a concentration of near field without an auxiliary metal structure.
Figure 5B:
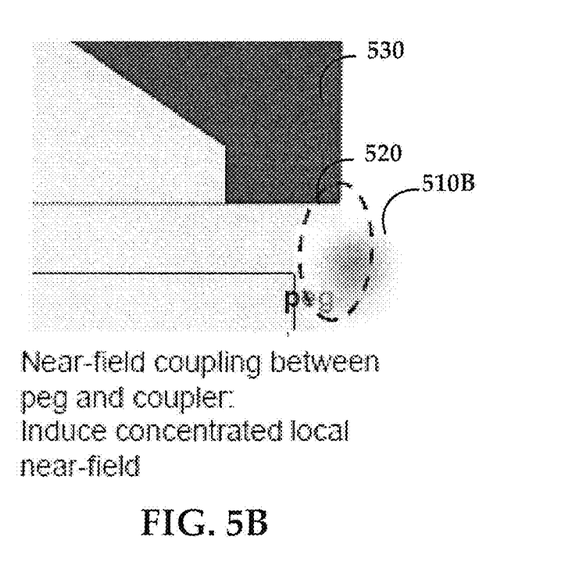
FIG. 5B shows a concentration of near field using an NFT having auxiliary metal structure according to various aspects.

FIG. 5A illustrates a concentration of near field 510A without an auxiliary structure. FIG. 5B shows the concentration of near field 610B with an auxiliary structure 520. As can be observed from FIGS. 5A and 5B, the concentration of near-field is enlarged compared with the concentration of near-field in FIG. 5B. The auxiliary structure 520 of FIG. 5B causes a local concentration of near field 510B toward the magnetic pole 530.

Figure 6A:
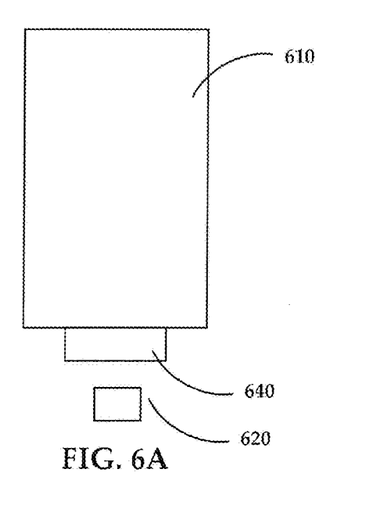
FIGS. 6A-6D illustrate various shapes and configurations for the auxiliary structure according to various embodiments.
Figure 6B:
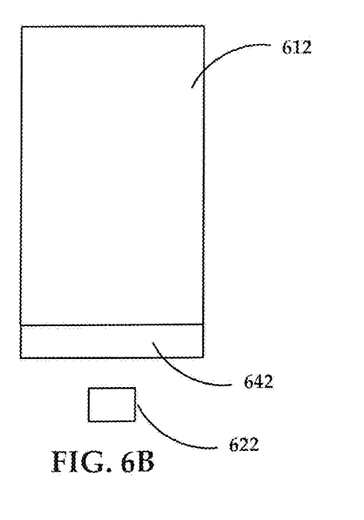
Figure 6C:
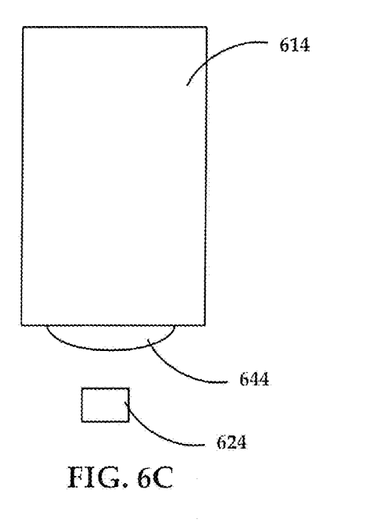
Figure 6D:
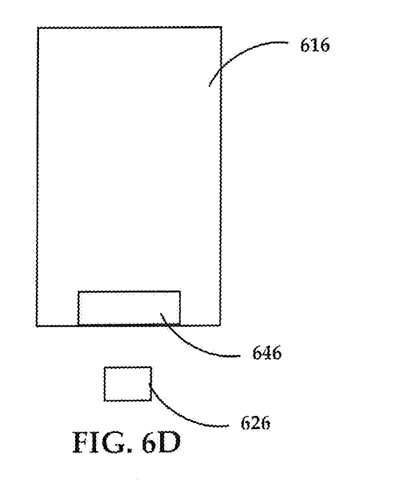

FIGS. 6A-6D illustrate various configurations and shapes for the auxiliary structure. In all of these figures, an NFT peg is below the auxiliary structures and separated therefrom by a gap. FIG. 6A shows a magnetic pole 610, NFT peg 620, and a rectangular auxiliary structure 640 having a width that is less than that of the magnetic pole 610 as shown. In some cases, the auxiliary structure 642 has a width that is substantially the same as the width of the magnetic pole 612 as shown in FIG. 6B, separated from peg 622 by a gap. FIG. 6C shows a magnetic pole 614 and an auxiliary structure 644 that comprises a curvature between the structure 644 and NFT peg 624. According to one implementation, a side of the auxiliary structure 646 that faces an NFT peg 626 may be flush with the magnetic pole 616 as shown in FIG. 6C.

Figure 7A:
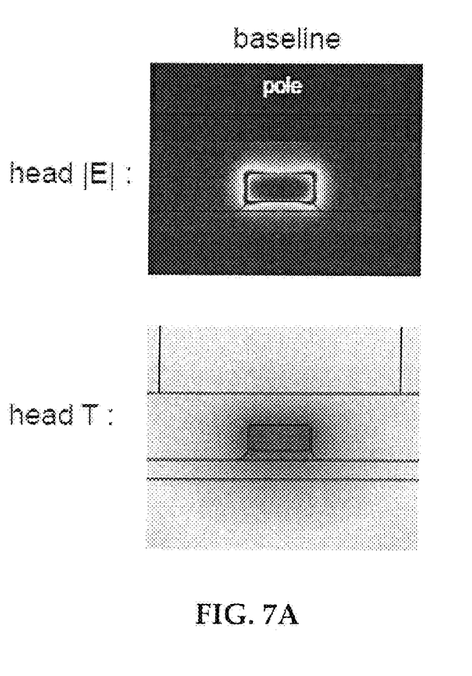
FIGS. 7A-7D illustrate the field distribution and peg temperature for various auxiliary structure widths.
Figure 7B:
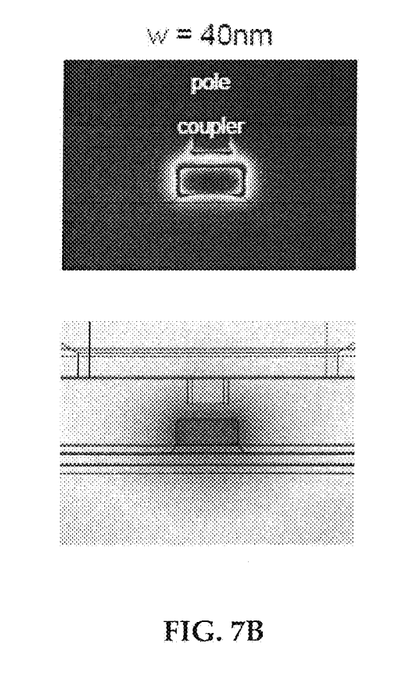
Figure 7C:
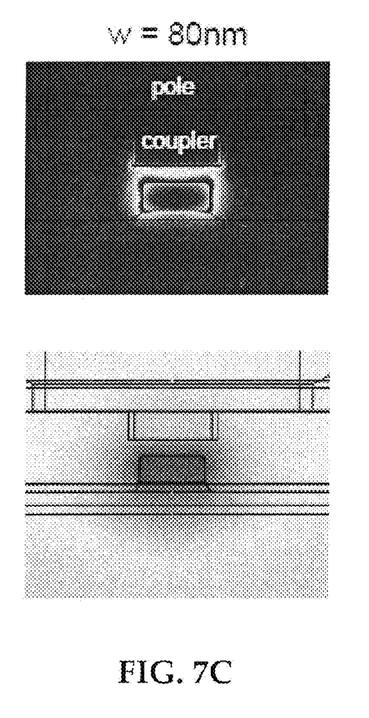
Figure 7D:
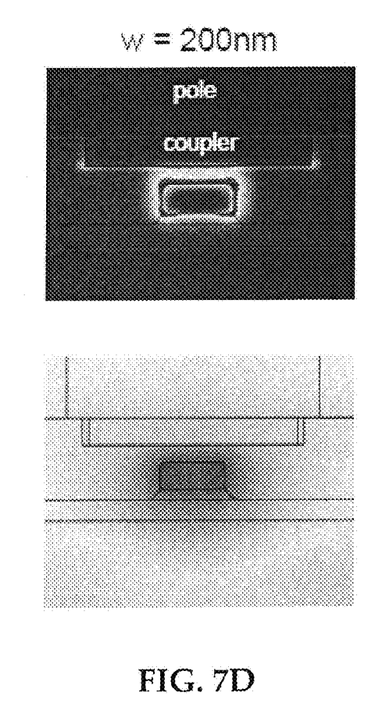

The auxiliary structure may increase a thermal gradient without causing a substantial increase in a temperature of the peg region. FIGS. 7A-7D illustrate the field distribution and peg temperature for various auxiliary structure widths. FIG. 7A illustrates the field distribution and the head peg temperature without an auxiliary structure disposed between the magnetic pole and the peg region. The field distribution and the peg temperature for FIG. 7A represent baseline values. FIG. 7B shows the field distribution and the peg temperature for a device having an auxiliary structure having a width of 40 nm. In this case, the thermal gradient is increased 52% from the baseline and the temperature of the peg region is increased by 6K. FIG. 7C illustrates the field distribution and the peg temperature for a device having an auxiliary structure having a width of 80 nm. In this case, the thermal gradient is increased 42% from the baseline and the temperature of the peg region is increased by 10K. FIG. 7D shows the field distribution and the peg temperature for a device having an auxiliary structure having a width of 200 nm. In this case, the thermal gradient is increased 29% from the baseline and the temperature of the peg region is increased by 8K.

Figure 8A:
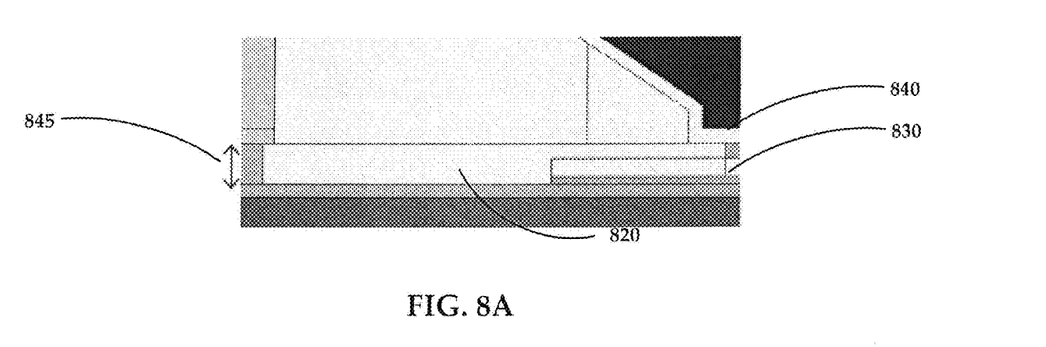
FIGS. 8A and 8B show an NFT according to some embodiments.
Figure 8B:
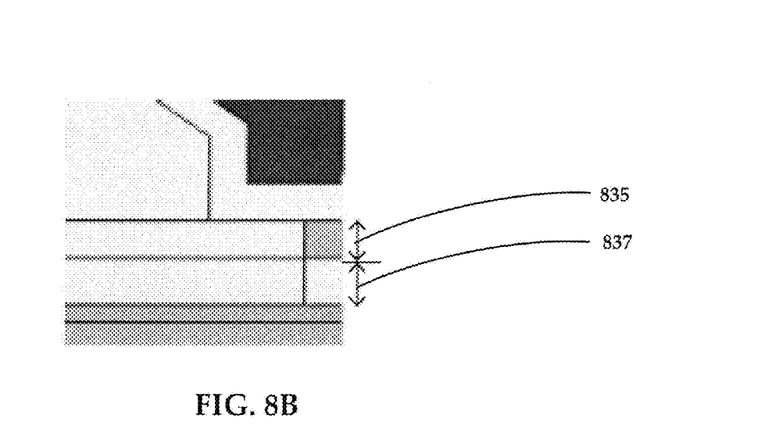

In FIGS. 8A and 8B, a block diagram illustrates an NFT according to another embodiment. A thickness 845 of a bottom stadium of an enlarged region 820 depends on the height 837 of a peg region 830 and a distance 835 between the peg region 830 and the auxiliary structure 840. The thickness of the bottom stadium 845 of the enlarged region 820 is dependent on the height of the peg 837 and the distance between the peg and the auxiliary structure 835. The analysis illustrates how these values may be chosen for a given design.

Figure 9A:
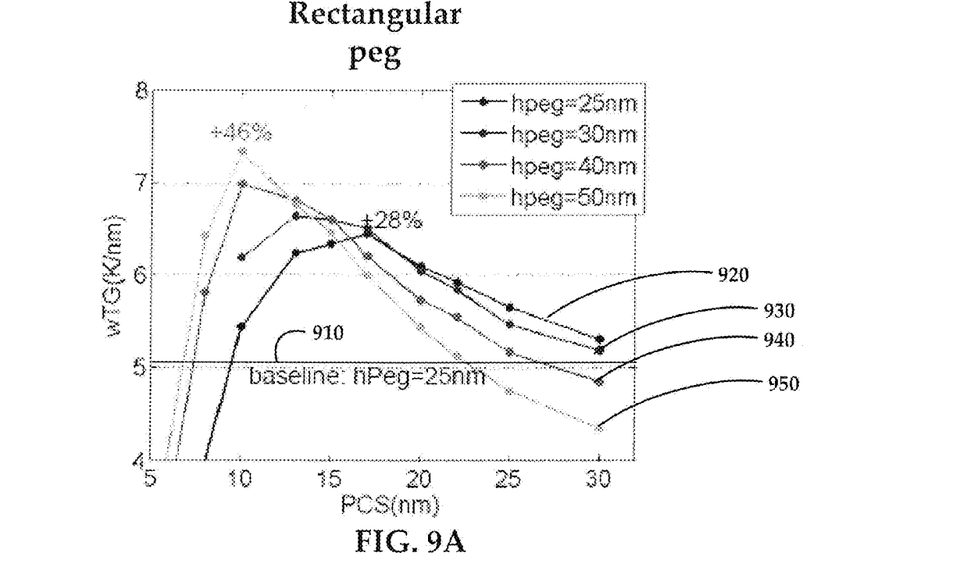
FIG. 9A illustrates the modeled effect of peg height and the distance between the peg region and the auxiliary structure on the thermal gradient.
Figure 9B:
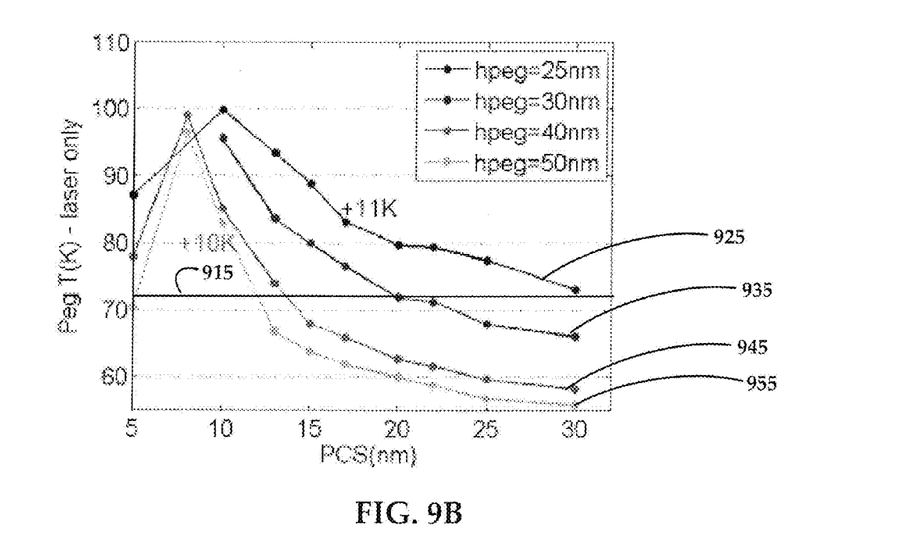
FIG. 9B shows the modeled effect of peg height and the distance between the peg region and the auxiliary structure on the peg temperature.

A graph in FIG. 9A shows the modeled effect of peg height (height 837 in FIG. 8B) and the distance between the peg region and the auxiliary structure (distance 835 in FIG. 8B, also referred to herein as "PCS") on the thermal gradient. The models are based on an NFT-top-pole spacing (NPS) of 40 nm, a cross-track peg width of 60 nm, and a 375 ktpi track pitch with a rectangular peg. All of the thermal gradient values are compared to baseline case with no auxiliary structure as indicated by line 910. The peg height of the baseline case is 25 nm. The model shows the thermal gradient for a peg height of 25 nm (curve 920), a peg height of 30 nm (curve 930), a peg height of 40 nm (curve 940), and a peg height of 50 nm (curve 950). The highest thermal gradient change using a peg height of 25 nm was +28% from the baseline. The highest thermal gradient using a peg height of 40 nm was +38% from the baseline. The highest thermal gradient using a peg height of 50 nm was +46% from the baseline. According to various implementations, using a peg height of 25 nm, the core-to-peg spacing is about 17 nm at the center +1-5 nm for a range of about 12 nm to about 22 nm. The change in the thermal gradient is about +17% to about +28% at 17 nm. In some cases, using a peg height of 40 nm, the core-to-peg spacing is about 15 nm at the center +/−5 nm for a range of about 10 nm to about 20 nm. The change in the thermal gradient is about +14% to about +38% at 15 nm A graph in FIG. 9B shows the modeled effect of peg height and the distance between the peg region and the auxiliary structure on the peg temperature. The models are based on an NPS of 40 nm, a peg width of 60 nm, and a 375 ktpi track pitch. All of the thermal temperature values are compared to baseline case (no auxiliary structure) with peg height of 25 nm, indicated by line 915. The graph shows the temperature for a peg height of 25 nm (curve 925), a peg height of 30 nm (curve 935), a peg height of 40 nm (curve 945), and a peg height of 50 nm (curve 955).

Figure 10A:
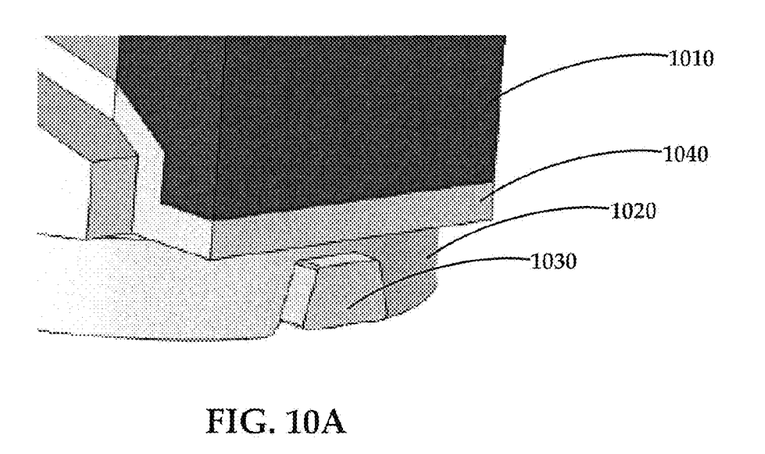
FIGS. 10A and 10B illustrate an NFT having an inverse trapezoid peg according to various implementations.
Figure 10B:
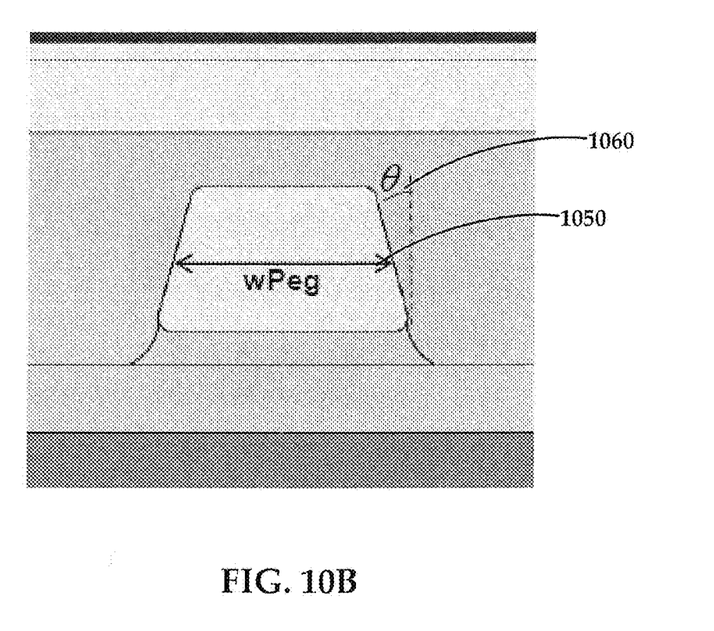

In other embodiments, the peg shape may an inverse trapezoid as shown in FIGS. 10A and 10B. FIG. 10A illustrates a magnetic pole 1010, an enlarged region 1020, an auxiliary structure 1040, and an inverse trapezoid peg region 1030. As shows in FIG. 10A the side of the peg that faces the auxiliary structure and the magnetic pole is shorter than the side that faces away from the auxiliary structure and the magnetic pole. FIG. 10B shows a closer view of the trapezoid peg. For purposes of the following analysis, the width of the peg at the midsection 1050 is 60 nm, and the wall angle 1060 is 15°.

Figure 11A:
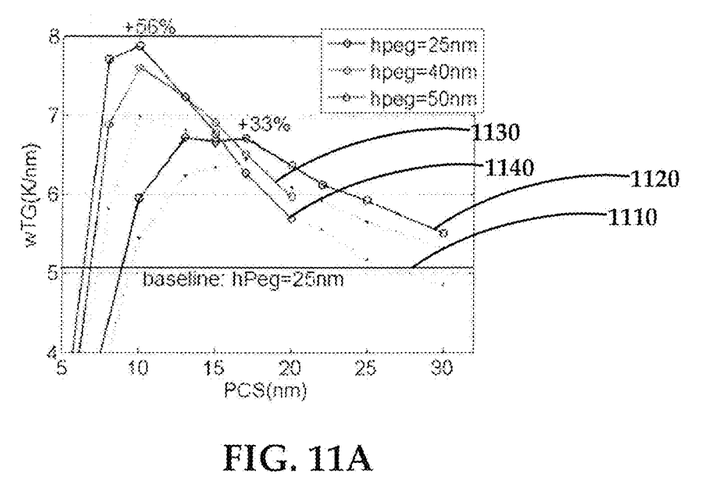
FIG. 11A shows the modeled effect of peg height for an inverse trapezoid peg and the distance between the peg region and the auxiliary structure on the thermal gradient.

FIG. 11A shows the modeled effect of peg height for an inverse trapezoid peg and the distance between the peg region and the auxiliary structure on the thermal gradient. The models are based on an NPS of 40 nm, a peg width of 60 nm, a 375 ktpi track pitch, and a trench depth of 9 nm. All of the thermal gradient values are compared to baseline (no auxiliary structure) with peg height value of 25 nm (line 1110). The model shows the thermal gradient for a peg height of 25 nm (curve 1120), a peg height of 40 nm (curve 1130), and a peg height of 50 nm (curve 1140). The modeled thermal gradient change using a peg height of 25 nm (curve 1120 was +33% from the baseline. The modeled thermal gradient using a peg height of 50 nm 1140 was +56% from the baseline.

Figure 11B:
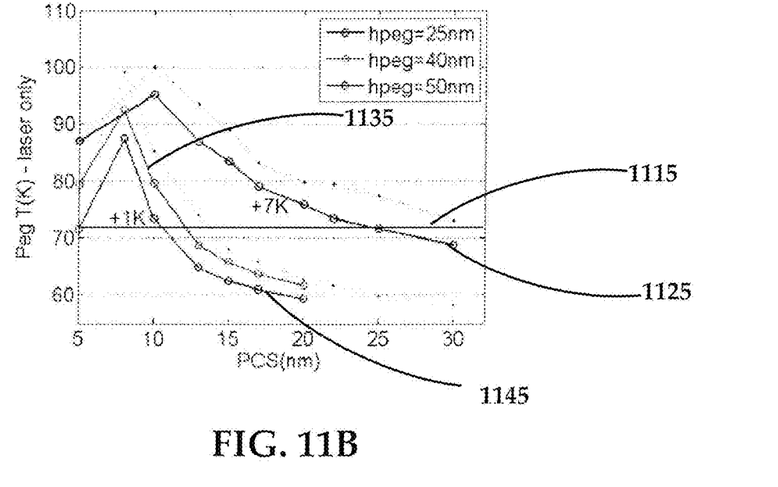
FIG. 11B illustrates the modeled effect of peg height for an inverse trapezoid peg and the distance between the peg region and the auxiliary structure on the peg temperature.

FIG. 11B illustrates the modeled effect of peg height for an inverse trapezoid peg and the distance between the peg region and the auxiliary structure on the peg temperature. The models are based on an NPS of 40 nm, a peg width of 60 nm, a 375 ktpi track pitch, and a trench depth of 9 nm. All of the peg temperature values are compared to baseline (no auxiliary structure) with peg height value of 25 nm (line 1115). The model shows the temperature for a peg height of 25 nm (curve 1125), a peg height of 40 nm (curve 1135), and a peg height of 50 nm (curve 1145).

Table 1 summarizes the best-case change in thermal gradient (ΔTG) and the change in peg temperature (ΔT) for both a rectangular peg (Rect) and the inverse trapezoid peg (i-trap) at various peg heights (hPeg) based on the analysis above.

| hPeg | ΔTG | | Peg ΔT | |
| --- | --- | --- | --- | --- |
| | Rect | i-trap | Rect | i-trap |
| 25 nm | +28% | +33% | +11K | +7K |
| 40 nm | +38% | +50% | +13K | +7.4K |
| 50 nm | +45% | +56% | +10K | +1.3K |

Figure 12:
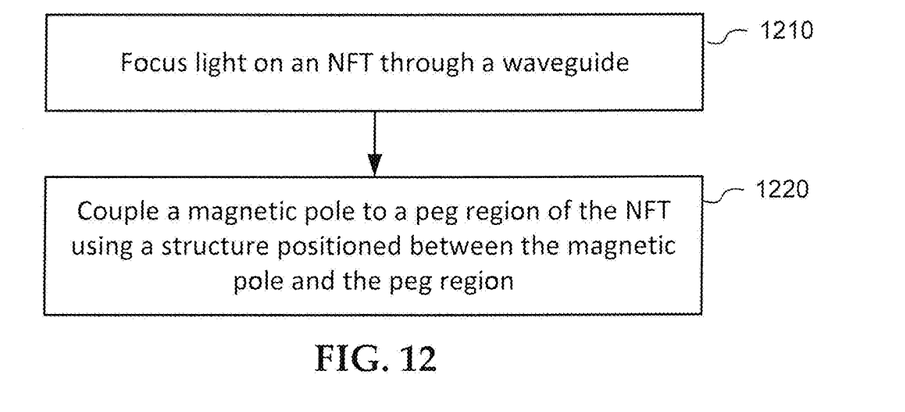
FIG. 12 shows a flow diagram in accordance with various embodiments.

FIG. 12 is a flow diagram in accordance with various embodiments. Light propagating through a waveguide or reflected by a solid immersion mirror (SIM) is focused 1210 onto an NFT. According to various implementations, the NFT includes an enlarged region and a peg extending from the enlarged region towards a media-facing surface. The peg region faces away from the magnetic pole. A structure is positioned between the magnetic pole and the peg region. The structure extends from the enlarged region towards the media-facing surface. The magnetic pole is coupled 1220 to the magnetic pole using the structure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

The invention claimed is:

1. An apparatus comprising:
   a waveguide;
   a magnetic pole; and
   a near-field transducer positioned at or near a media-facing surface and operatively coupled to the waveguide, the near-field transducer comprising:
   an enlarged region;
   a peg region extending from the enlarged region towards the media-facing surface, the peg region separated from the magnetic pole; and
   a structure positioned between the magnetic pole and the peg region and separated from the peg region by a gap, the structure extending from the enlarged region towards the media-facing surface and configured to extend generation of surface plasmons toward the magnetic pole.

2. The apparatus of claim 1, wherein the structure is a metallic structure.

3. The apparatus of claim 1, wherein the structure comprises one or more of Ag and Au.

4. The apparatus of claim 1, wherein the gap is filled with a dielectric material.

5. The apparatus of claim 4, wherein the structure reduces diffusion of material of the magnetic pole into the dielectric material.

6. The apparatus of claim 1, wherein the structure causes an increase in a thermal gradient in a down-track direction of a hotspot on a recording medium.

7. The apparatus of claim 1, wherein a surface of the structure facing the peg region comprises a curvature.

8. The apparatus of claim 1, wherein the structure causes near-field excitation to be concentrated near the magnetic pole.

9. The apparatus of claim 1, wherein the peg region comprises an inverse trapezoid, having a long side and a short side, the short side being substantially parallel to the long side and wherein the short side faces the magnetic pole.

10. The apparatus of claim 1, wherein a height of the peg region is about 25 nm to about 50 nm, the height measured from a peg surface facing the magnetic pole to the peg surface facing away from the magnetic pole.

11. The apparatus of claim 1, wherein the width of the peg region at a midsection of the peg region is 60 nm.

12. The apparatus of claim 1, wherein the peg region is rectangular.

13. An apparatus, comprising
    a waveguide;
    a magnetic pole; and
    a near-field transducer positioned at or near a media-facing surface and operatively coupled to the waveguide, the near-field transducer comprising:
    an enlarged region;
    an inverse trapezoidal peg region extending from the enlarged region towards the media-facing surface, the peg region separated from the magnetic pole; and
    a metallic structure positioned between the magnetic pole and the peg region and separated from, the peg region by a gap, the structure extending from the enlarged region towards the media-facing surface and configured to extend generation of surface plasmons toward the magnetic pole.

14. The apparatus of claim 13, wherein the inverse trapezoidal peg region comprises a long side and a short side, the short side being substantially parallel to the long side and wherein the short side faces the magnetic pole.

15. The apparatus of claim 13, wherein the gap is filled with a dielectric material, and wherein the structure reduces diffusion of a material of the magnetic pole into the dielectric material.

16. The apparatus of claim 13, wherein the structure causes an increase in a thermal gradient in a down-track direction of a hotspot on a recording medium.

17. A method, comprising:
    focusing light propagating through a waveguide onto a near-field transducer, the near-field transducer comprising:
    an enlarged region;
    a peg region extending from the enlarged region towards the media-facing surface, the peg region separated from a magnetic pole; and
    a structure positioned between the magnetic pole and the peg region and separated from the peg region by a gap, the structure extending from the enlarged region towards the media-facing surface; and
    extending generation of surface plasmons towards the magnetic recording pole via the structure.

18. The method of claim 17, wherein the peg region comprises a rectangular shape.

19. The method of claim 17, wherein the peg region comprises an inverse trapezoid, having a long side and a short side, the short side being substantially parallel to the long side and wherein the short side faces the magnetic pole.

* * * * *